US011993426B2

(12) United States Patent
Koenigseder et al.

(10) Patent No.: US 11,993,426 B2
(45) Date of Patent: May 28, 2024

(54) CLOSURE DEVICE

(71) Applicant: Aptar Freyung GmbH, Freyung (DE)

(72) Inventors: Bruno Koenigseder, Roehrnbach (DE); Daniel Frey, Grainet (DE); Andreas Rueckert, Ringelai (DE)

(73) Assignee: Aptar Freyung GmbH, Freyung (DE)

( * ) Notice: Subject to any disclaimer, the term of this patent is extended or adjusted under 35 U.S.C. 154(b) by 237 days.

(21) Appl. No.: 17/775,182

(22) PCT Filed: Nov. 7, 2019

(86) PCT No.: PCT/EP2019/025386
§ 371 (c)(1),
(2) Date: May 6, 2022

(87) PCT Pub. No.: WO2021/089103
PCT Pub. Date: May 14, 2021

(65) Prior Publication Data
US 2022/0388733 A1    Dec. 8, 2022

(51) Int. Cl.
*B65D 47/08*    (2006.01)
*B65D 55/02*    (2006.01)
(Continued)

(52) U.S. Cl.
CPC ....... *B65D 47/0838* (2013.01); *B65D 55/024* (2013.01); *B65D 55/026* (2013.01);
(Continued)

(58) Field of Classification Search
CPC .............. B65D 47/0838; B65D 55/024; B65D 55/026; B65D 2401/30; B65D 2401/55;
(Continued)

(56) References Cited

U.S. PATENT DOCUMENTS 6,540,114 B1    4/2003   Popovich et al.
6,644,487 B2 *  11/2003  Smith ................ B65D 47/0885
                                                222/541.6
(Continued)

FOREIGN PATENT DOCUMENTS

AU    2001273593 B2    2/2005
CN       1545469 A     11/2004
(Continued)

OTHER PUBLICATIONS

Written Opinion and Search Report dated Feb. 26, 2020 for PCT/EP2019/025386 of which this is subject application a US National Phase.

*Primary Examiner* — Bob Zadeh
(74) *Attorney, Agent, or Firm* — Wood, Phillips, Katz, Clark & Mortimer

(57) ABSTRACT

The present invention relates to a closure device (1) for a container (2) in which a flowable material (3) is stored, comprising a base element (4), which can be fastened on a container opening (5) of the container (2), a spout (11) with a dispensing opening (7), whereby the spout (11) is positioned inboard of the base element (4), and a lid (8) connected to the base element (4) by a hinge (12), whereby the lid (8) can be moved back and forth between a closed position (9) in which the lid (8) closes the dispensing opening (7) so that the spout (11) is not accessible and an open position (10) in which the spout (11) is accessible, tamper evidence indication means (13) for visually indicating if the lid (8) of the closure device (1) has once been moved out of its closed position (9).

12 Claims, 11 Drawing Sheets

(51) Int. Cl.
 B29C 45/00 (2006.01)
 B29C 45/16 (2006.01)
 B29L 31/56 (2006.01)

(52) U.S. Cl.
 CPC .......... *B29C 45/0081* (2013.01); *B29C 45/16* (2013.01); *B29L 2031/565* (2013.01); *B65D 2401/30* (2020.05); *B65D 2401/55* (2020.05)

(58) Field of Classification Search
 CPC ............ B65D 2401/00; B65D 47/0804; B29C 45/0081; B29C 45/16; B29L 2031/565
 See application file for complete search history.

(56) References Cited

U.S. PATENT DOCUMENTS

| | | | |
|---|---|---|---|
| 9,932,158 B2* | 4/2018 | Rognard | B65D 47/0828 |
| 2007/0102389 A1* | 5/2007 | Hoepner | B65D 55/024 |
| | | | 215/235 |
| 2008/0110933 A1 | 5/2008 | Goncalves | |
| 2015/0251820 A1 | 9/2015 | Glaser et al. | |
| 2016/0244219 A1* | 8/2016 | Benoit-Gonin | B65D 47/0804 |
| 2022/0388733 A1* | 12/2022 | Koenigseder | B65D 55/026 |

FOREIGN PATENT DOCUMENTS

| | | |
|---|---|---|
| CN | 1863710 A | 11/2006 |
| WO | 9928205 A1 | 6/1999 |
| WO | 2015049066 A1 | 4/2015 |
| WO | 2015121177 A1 | 8/2015 |
| WO | 2017068151 A1 | 4/2017 |

\* cited by examiner

CLOSURE DEVICE

FIELD OF THE INVENTION

The present invention relates to a closure device for a container in which a flowable material is stored, comprising a base element, which can be fastened on a container opening of the container, a pout with a dispensing opening whereby the spout is positioned inboard of the base element, and a lid connected to the base element by a hinge, whereby the lid can be moved back and forth between a closed position in which the lid closes the dispensing opening so that the flowable material is retained in the container and an open position in which the flowable material can be released from the container, tamper evidence indication means for visually indicating if the lid of the closure device has once been moved out of its closed position.

BACKGROUND OF THE INVENTION

Closure devices for containers are well known in the state of the art. To increase the consumer confidence in an according closures and containers, it has been a continuous demand in tamper evidence indications means, showing the consumer whether or not a closure device has already once been opened.

The technical problem which the invention seeks to solve is hence to provide a closure device with improved tamper evidence indication means, especially with tamper evidence indication means that are economically to manufacture and that can provide a safe and hygienic functionality.

BRIEF SUMMARY OF THE INVENTION

This problem is being solved by a closure device for a container in which a flowable material is stored, comprising a base element, which can be fastened on a container opening of the container, a pout with a dispensing opening whereby the spout is positioned inboard of the base element, and a lid connected to the base element by a hinge, whereby the lid can be moved back and forth between a closed position in which the lid closes the dispensing opening so that the flowable material is retained in the container and an open position in which the flowable material can be released from the container, tamper evidence indication means for visually indicating if the lid of the closure device has once been moved out of its closed position, the tamper evidence indication means comprise a first indication ring and at least a second indication ring, whereby the first indication ring and the second indication ring are connected by at least one frangible bridge which is configured to be disrupted when the lid is moved from its closed position, causing an axial movement of the first indication ring relative to the second indication ring, whereby the first indication ring and the second indication ring are coaxially positioned to each other and the first indication ring and the second indication ring having an axially overlapping section before and after the lid of the closure device has once been moved out of its closed position.

This will provide a labyrinth type of sealing arrangement which supports to protect the spout from dust or insect ingress. The drinking spout is hence protected by the temper evidence indication rings both prior and after first opening. As the direction for potential dust intake into the closure device is mainly in radial direction, the overlapping temper evidence indication rings conceal the spout by being positioned one above the other in axial direction. Another beneficial effect of the overlapping section of the first and the second indication ring is that the disrupted connection between the second indication ring and the frangible bridge/s remain covered by the first indication ring, hence supporting an aesthetically appealing appearance of the second indication ring.

A container according to this invention is any receptacle or enclosure for holding a product used in storage, packaging, and shipping. Flowable materials kept inside of a container are protected by being inside of its structure. A container according to this invention can be especially selected from the group of bottles, particularly plastic bottles, cans or bags. The container can be pressurised or non-pressurised in its initially closed state.

A flowable material according to this invention may be selected from the group of fluids, gels, pastes, gases, granular solids in particulate form or mixtures thereof. A flowable material according to this invention can be especially selected from the group of carbonated and non-carbonated drinks, particularly sport drinks, including water, mineral water, isotonic sport drinks.

A lid, also referred to as cover, according to this invention is considered as being part of the closure device that serves as closure and/or seal for the dispensing opening, especially one that completely closes the dispensing opening. Preferably, the lid is made of a transparent plastic material. The lid may also be configured in a way that the shell surface of the lid is made partly or entirely of a transparent plastic material to allow the visibility of the temper evidence means from outside of the closure device. It is especially preferred, that the lid has a transparency of 40-100%, highly preferred 50-95%, most preferred 60-90%. The transparency may be determined with reference to the standards ASTM D 1003, ISO 13468, 14782.

According to a preferred embodiment of the invention the tamper evidence so indication means comprise a first indication ring and at least a second indication ring which is co-axially arranged in the first indication ring, whereby the first indication ring and the second indication ring are connected by at least one radially oriented frangible bridge which is configured to be disrupted when the lid is moved from its closed position, causing an axial movement of the first indication ring relative to the second indication ring, whereby the first indication ring has a first optical property and the second indication ring has a second optical property being different form the first optical property.

According to an advantageous embodiment of the invention, it may be provided that an optical property is chosen from a group comprising light absorption properties, light reflection properties, transparency, opacity, gloss, a surface structure, especially one or more openings, one or more elevations, one or more recesses and any combination of these properties.

The light absorption of a surface or solid body can be determined by the reflected colour spectrum of this surface or solid body using a spectrophotometer (also called spectroreflectometer or reflectometer). Further reference is made to the according norms DIN 5033, ASTM E 1347, ASTM E 805.

The gloss of a surface or solid body may be determined according to the standards DIN 67530, ASTM E 430, DIN EN ISO 2813. The gloss may be especially determined with a glossmeter. It is preferred to conduct the gloss measurement at an measurement angle of 60°. A high gloss according to this invention is considered to have Gloss Units (GU)>50 at a measurement angle of 60°. A low gloss according to this invention is considered to have Gloss Units (GU)<30 at a measurement angle of 60°.

| First indication ring | | | | Second indication ring | | | Spout |
| --- | --- | --- | --- | --- | --- | --- | --- |
| 1 White | Low gloss | Opaque | Colour | High gloss | Opaque | | |
| 2 White | | Opaque | Colour | Transparency | High Gloss | White | High Gloss |
| 3 White | | Opaque | White | Openings | Opaque | Colour | |
| 4 White | Elevations/recesses | Opaque | White | | Opaque | | |
| 5 White | | Opaque | | Transparency | | Colour | |

The table specifies non-limiting examples for possible advantageous combinations of optical properties of the first indication ring and the second indication ring as well as beneficial additional combinations of optical properties of the spout.

According to the first especially preferred combination of optical properties, the first indication ring is made of an opaque material which has a colour perceived as white with a low gloss surface, whereas the second indication ring is made of an opaque material which has a colour perceived as being different from white, preferably perceived as red, orange, blue or violet, with a high gloss surface. With the second indication ring having a higher optical contrast by different colour and gloss properties, the optical distinguishability of the temper evidence means being in their original closed position and its once-open position is improved.

According to the second particularly preferred combination of optical properties, the first indication ring is made of an opaque material which has a colour perceived as white, whereas the second indication ring is made of a transparent material which has a colour perceived as being different from white, preferably perceived as red, orange, blue or violet, with a preferably high gloss surface. The spout preferably has a colour perceived as being white with a preferably high gloss surface. Here, a high optical contrast is achieved by the different colour and the optical depth of the transparent second indication ring which may be additionally contrasted by the spout being perceived as white with a high gloss surface.

According to the third very preferred combination of optical properties, the first indication ring is made of an opaque material which has a colour perceived as white, whereas the second indication ring is made of an opaque material which has a colour perceived as being white, whereby the second indication ring comprises opening, for example in the shape of letters. The spout preferably has a colour perceived as being different from white, preferably perceived as red, orange, blue or violet. Here, a high optical contrast is achieved by the different colour between the second indication, its openings and the colour of the spout. The advantage of this embodiment is, that the temper evidence means may have the same colour and may be manufactured in a single injection moulding process without the necessity to colour one of the indication rings after the moulding.

According to the fourth highly preferred combination of optical properties, the first indication ring is made of an opaque material which has a colour perceived as white with elevations and/or recesses in its surface, for example in the shape of letters, whereas the second indication ring is made of an opaque material which has a colour perceived as being white. Again, the advantage of this embodiment is, that the temper evidence means may have the same colour and may be manufactured in a single injection moulding process without the necessity to colour one of the indication rings after the moulding.

According to a fifth extremely preferred combination of optical properties, the first indication ring is made of an opaque material which has a colour perceived as white, whereas the second indication ring is made of a transparent material which has a colour perceived as being different from white, preferably perceived as red, orange, blue or violet. The spout preferably has a colour perceived as being different from white with a preferably high gloss surface. Here, a high optical contrast is achieved by the different colour and the optical depth of the transparent second indication ring which may be additionally contrasted by the spout being perceived as different from white with a high gloss surface.

According to a further preferred embodiment of the invention, it may also be provided that the first optical property is light absorption in the range of 380-750 nm and the second optical property is light absorption in the range of 380-750 nm, whereby the light absorption ranges of the first optical property and the second optical property are different from each other. By this configuration it can be achieved that an visually improved and—for the consumer—easily distinguishable optical indication of the tamper evidence of the closure device is provided.

Furthermore, according to an equally advantageous embodiment of the invention, it may be provided that the first optical property is a light absorption rate below 5% over the range of 380-750 nm and the second optical property is a light absorption rate above 50% in the range of 380-750 nm. The advantageous effect of this embodiment is based on the fact that the optical contrast of between the first indication ring and the second indication ring is increased to further improve the visual distinguishability between the originally closed and the once-opened state of the closure device.

According to another particularly preferred embodiment of the invention, it may be provided that the first optical property is a light absorption rate below 5% over the range of 380-750 nm and the second optical property is a light absorption rate above 50% in the range of 380-750 nm and the spout has a light absorption rate below 5% over the range of 380-750 nm. In particular, this shall have the effect that the optical contrast of the second indication ring in relation to the spout and the first indication ring is further improved. It is further preferred that the first indication ring is perceived as being white, the spout is perceived as being white while the second indication ring is perceived as having a colour other than white, especially a colour perceived as red, orange, blue or violet.

Furthermore, the invention may also be further developed to the effect that the first indication ring has a first axial height and the second indication ring has a second axial height whereby in the non-disrupted condition the second axial height is completely covered by the first axial height. Preferably the first axial height and the second axial height are chosen to be between 1.5:1-5:1. It is further preferred that the first indication ring and the second indication ring are aligned at their top edges.

In another preferred embodiment of the invention, it may also be provided that the first indication ring has a first radial ring width and the second indication ring has a second radial ring width which is different from the first radial ring width. This can achieve that the temper evidence indication means can be further tailored to specific demands.

It can also be advantageous to further develop the invention in such a way that the tamper evidence indication means are made from one or more plastic materials by bi-injection moulding. The advantage, which can be realized by this, is that the different optical properties of the first indication ring and the second indication ring can be realised and configured in one manufacturing step with moulding the tamper evidence indication means.

It would also be possible to paint the tamper evidence indication means to achieve different optical properties between the first indication ring and the second indication ring.

The frangible bridge/s can be integrally formed with the first indication ring. It is preferred that the second indication ring is connected to the frangible bridge/s. In this case, it is especially preferred that the first indication ring with the frangible bridge/s and the second indication ring are formed in a bi-injection moulding process, with the plastic material of the second indication ring being different form the plastic material of the first indication ring and the frangible bridge/s. The connection between the second indication ring and the frangible bridge/s is preferably configured to be disrupted when the lid is once moved out of its initial close position. Hence, the bridge remains with the first indication ring after the disruption. This will leave the second indication visible without the frangible bridges, which remain invisible for the consumer on the first indication ring.

It is especially preferred that the frangible bridge/s is/are ring shaped or ring-segment shaped. It is most preferred that the ring-shape or the ring-segment-shape is flat, hence, the thickness of the ring-shape or ring-segment-shape is lower than the radial length. In a highly preferred embodiment of the invention, the frangible bridge/s has/have a radial length between 0.3-1.2 mm, more preferred between 0.5-1 mm. It is further preferred that the axial thickness of the frangible bridge/s is/are selected to be between 0.1-1.0 mm, more preferred between 0.15-0.8 mm, highly preferred between 0.2-0.6 mm. In yet another preferred embodiment of the invention, the temper evidence indication means comprise a plurality of frangible bridges, whereby it is preferred that the number of frangible bridges is selected between 3-12, more preferred 4-9, highly preferred 4-8, most preferred 6. It is highly preferred that the plurality of frangible bridges are essentially identical in shape. It is further preferred that the plurality of frangible bridges are equidistantly positioned between the first and the second indication ring. In yet another preferred execution of the invention, six essentially identical frangible bridges are equidistantly positions between the first and the second indication ring at an angle of 60°.

According to a further preferred embodiment of the invention object, it may be provided that the second indication ring is connected to the lid whereby the axial movement of the first indication ring is limited at a defined position within the base element in the direction of the opening of the lid, causing a disruption of the radially oriented frangible bridge, when the lid is moved out of its closed position.

This will realise the effect that the indication whether or not the closure device has once been opened is irreversible.

The invention may also be advantageously be further improved to the effect that the lid comprises a spout sealing ring which projects from the lid bottom axially inwardly into the closure device and which contacts the outer surface of the spout, whereby the second indication ring is connected to the spout sealing ring.

The spout sealing ring can be monolithically made with the lid. It is further preferred that the spout sealing ring is made from a transparent plastic material so that the spout is visible through the spout sealing ring from outside the closure device. Alternatively, the spout sealing ring can be made partly or completely from an opaque plastic material, which partly or completely prevent the view on the spout from outside the closure device.

According to another preferred embodiment of the invention, the inner surface of the second indication ring completely contacts the outer surface of the spout sealing ring. Alternatively, the inner surface of the second indication ring contacts the outer surface of the sealing ring only partly. In that case the second indication can project axially into the direction of the container with a cylinder segment in contact with the spout sealing ring an with a cylinder-ring segment not in contact with the spout sealing ring. With this embodiment it is possible to further improve the optical contrast of the second indication ring, especially when the second indication ring is transparent and the spout and the spout sealing ring have different optical properties.

In another preferred embodiment of the invention it is intended that the first indication ring comprises a flange projecting radially to the outside of the closure device at its distal end facing the container. The advantages that can be realised through this configuration is that the first indication ring can be positioned loss-proof in the closure device and that the first indication ring has a centre of gravity which is shifted towards the distal end of the first indication ring facing the container, which improves a controlled linear axial movement of the first indication ring after disruption of the frangible bridge/s.

It is further preferred to configure the invention in such a way that the second indication ring comprises interlocking means for fixing the second indication ring on the spout sealing ring. This will realise the benefit of a snap-fit connection between the second indication ring and the spout sealing ring, which supports an easy assembly of the closure device without any additional welding or gluing measures.

According to a particularly preferred embodiment of the invention it can be provided that the lid comprises a shell surface, whereby the shell surface is at least partly concavely shaped. With this preferred configuration the radial distance between the shell surface of the lid and the second indication ring is decreased leading to an improved optical visibility of the temper evidence indication means.

It can be also preferred that the radial distance between the inner shell surface of the lid and the outer surface of the spout is between 1-10 mm, preferred between 2-7 mm, especially preferred between 2-5 mm. The benefit realised by this preferred embodiment is that the visibility of the temper evidence indications means are further improved.

It may also be preferred to modify the invention in a way so that the first indication ring and the second indication ring are positioned inboard of the closure device, so that the first indication ring and the second indication ring are not in direct contact with the environment surrounding the closure device. This will lead to the realisation of temper evidence indication means which are protected from potential attempts of manipulation from outside the closure device. This is especially important as an intended manipulation of the temper evidence indication means is a safety critical aspect of the closure device. By the term "not in direct contact with the surrounding environment" mechanical contact is meant. A slight and minor exchange of gaseous substances such as air, air humidity or liquid substances might be possible. According to a preferred embodiment of the invention, the frangible bridge/s is/are radially oriented which further improves the manipulation safety of the temper evidence means from outside the closure device.

In another preferred embodiment of the invention it is intended that the base element comprises a flange projecting radially to the inside of the closure device defining a duct for pass-through of the spout, whereby the spout comprises a flange projecting radially to the outside of the closure device, whereby the spout is positioned at least partly inside of the base element so that a ring-shaped channel is formed between the spout flange and the base element flange. The advantage that can be realised through this configuration is that the ring-shaped channel serves as defined receiving space for the first indication ring after the disruption of the frangible bridge/s. The defined position of the first indication ring after the disruption of the frangible bridge/s is preferably located in the ring-shaped channel.

It is further preferred to configure the invention in such a way that the base element and the spout are configured to define an axial linear plain bearing in which the first indication ring is guided into its defined position after the disruption of the frangible bridge/s. The linear plain bearing assures a defined axial movement of the first indication ring into its defined position after the disruption of the frangible bridge/s.

Preferably, the inner surface of the first indication ring can be guided by an axial section of the spout. The outer surface of the first indication ring van be preferably guided by the axial front surface of the base element flange Furthermore, according to an also advantageous embodiment of the invention, it may be provided that the axially overlapping section after the lid has once been moved out of its closed position is between 5-20% of the first indication ring. This means that between 5-20% of the axial height of the first indication ring is overlapping with the axial height of the second indication ring. The advantageous effect of this embodiment is based on the fact that a good temper evidence indication and spout protection is achieved.

Furthermore, the invention may also be further developed to the effect that the bridge/s remain/s at the first indication ring after its/their disruption from the second indication ring. This will further enhance the safety against particulate intake from the outside to the drinking spout as it establishes a labyrinth pathway which is merely impossible to be migrated by particulates such as dust, sand or insects and hence provides an excellent protection of the drinking spout against such particulates.

The spring arrangement may comprise a plurality of spring elements. This will lead to a higher degree of redundancy in case one of the spring elements fail to function properly.

According to a specially preferred embodiment of the closure device, the spring elements are integrally formed with the base element. This will lead to less separate parts that need to be assembled during manufacturing and a more hassle-free assembly of the closure device. Nevertheless, it may be alternatively possible that the spring arrangement and/or the spring elements are separate parts e.g. placed in the base element.

To realise a well-functioning spring arrangement, it may be also considered that the spring elements are supported at their first distal end by the base ring and are supported with their second distal end at the flange of the first indication ring.

Due to the spring arrangement it would be also possible to use the closure device as a head-stand closure device where the container opening is facing into the direction of gravity. Such head-stand closures are especially known and convenient for paste-like and high-viscous products such as honey, ketchup, mayonnaise, tooth paste or the like. Hence, the spring arrangement can be configured to move the first indication ring against the direction of gravity into its defined position after disruption of the frangible bridge/s. Therefore, the temper evidence indication means of the inventive closure device may be applied to a conventional closure device as well as head-stand closure device without changing the design of the temper evidence means and/or closure device.

It has been proven to be particularly beneficial that the spring elements can be configured as spring tongues, particularly with a flat cuboid-shaped spatial form. The spring tongues can be comparatively easy manufactured while they provide good spring properties for the intended application.

For ensuring a uniform distribution of the spring force to the first indication ring, it may be preferred that the spring elements are arranged equidistantly around the inner surface of the cylinder-ring-shaped base element. This measure also supports to prevent the first indication ring to tilt when moved in its defined position after the disruption of the frangible bridge/s.

In order to apply a sufficient spring force to the first indication ring it may be foreseen that the spring elements have a radial length that is equal to the radial length of the flange of the base element.

In a yet further preferred embodiment of the invention, the spring arrangement is coupled with the flange of the first indication ring so that the spring force of the spring arrangement is applied to the flange. Through the radial projection of the flange an axially oriented spring force can be applied in a way that ensures a safe functioning of the temper evidence indication means. It is most preferred that the free ends of the spring elements, preferably configured as spring tongues, rest spring-loaded on the flange in the non-disrupted state of the frangible bridge/s.

The manufacturing process to produce a closure device according to this invention may comprise the following steps:
- Moulding of the base element, the lid and the hinge with the lid being moulded in its open position,
- Closing of the lid,
- Moulding of the tamper evidence indication means, whereby the tamper evidence indication means comprising a first indication ring and a second indication ring being coaxially positioned to each other and which are connected by at least one radially oriented frangible bridge, preferably in a bi-injection moulding process,
- Assembly of the tamper evidence indication means into the base element and the lid,
- Assembly of the spout into the base element.

This will process will provide an economical and safe manufacturing process for a closure device with temper evidence indication means.

For the manufacturing process it is especially preferred that the lid comprises a spout sealing ring which projects from the lid bottom axially inwardly into the closure device and which contacts the outer surface of the spout, whereby the second indication ring in its assembled state is connected to the spout sealing ring by interlocking means such as a snap-in-connection. This will further increase the easy and hassle-free assembly of the temper evidence indication means into the closure device.

According to a preferred embodiment of the manufacturing process, the assembly of the first indication ring and the second indication ring is axially supported by an assembly shaft, which moves the first indication ring and the second indication ring axially against the closure lid till the interlocking means of the second indication ring and the spout sealing ring engage. The assembly shaft assures that the frangible bridges connecting the first indication ring and the second indication ring are not disrupted during their assembly. Nevertheless, the frangible bridge/s provide/s may provide some compensation of rotational and axial stress during capping once they have been assembled to the closure device.

For the manufacturing process it is further preferred, that the first indication ring is coupled to a spring arrangement so that the first indication ring is spring-loaded in the direction of the container prior to the disruption of the frangible bridge/s, whereby the spring force applied to the first indication ring is configured to hold the first indication ring in a defined position after the disruption of the frangible bridge/s, whereby the spring elements are integrally formed with the base element during moulding of the base element. Alternatively, it may also be possible, that the spring arrangement is moulded as a separate part and assembled to the base element in a separate manufacturing step. In this alternative embodiment the spring arrangement may be configured as a plate spring or disc spring.

It is very preferred that the spring elements are spring-loaded during the assembly of the temper evidence indication means. Hence, the spring arrangement and it preloading can be achieved in a very economical and integrated manner during the manufacturing process.

BRIEF DESCRIPTION OF THE DRAWINGS

In the following, the invention will be explained in more detail on the basis of figures without limiting the general concept of the invention.

DETAILED DESCRIPTION OF THE PREFERRED EMBODIMENTS

Figure 1:
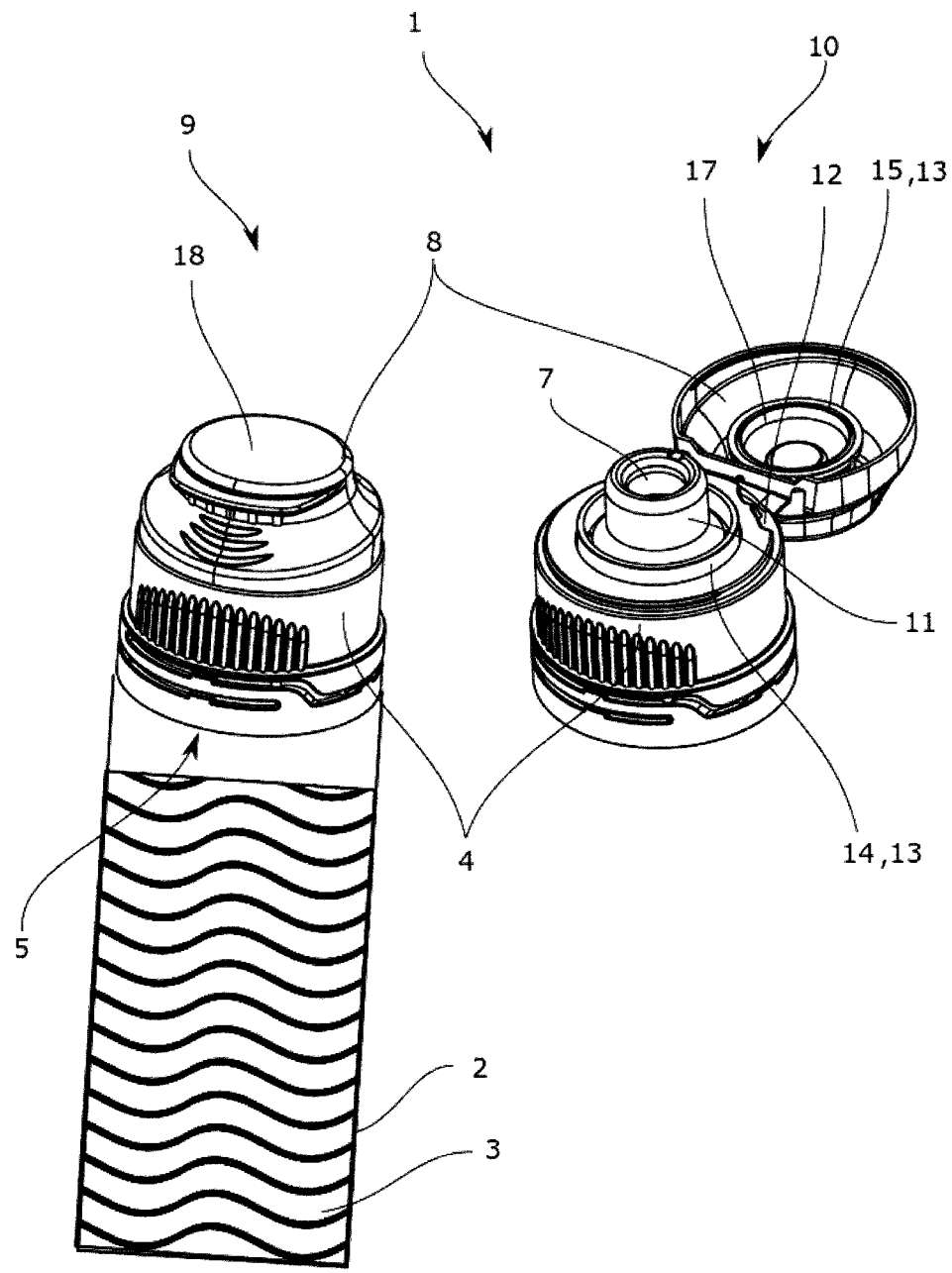
FIG. 1 an isometric view on a closed and an open closure device.

FIG. 1 shows an isometric view on a closed and an open closure device 1. The closure device 1 in its closed position 9 is shown in the left section of the FIG. 1 while the closure device 1 in its open position 10 can be found in the right section of FIG. 1. The FIG. 1 shows that closure device 1 is fixed to a container 2 in which a flowable material 3 is stored. The basically ring-shaped base element 4 of the closure device 1 can be fastened on a corresponding container opening 5 of the container 2, e.g. by screwing and/or snap-fit means.

As visible from the representation of the closure device 1 in its open position 10, the in general cylindrical spout 11 is positioned inboard of the base element 4 and has a dispensing opening 7 projecting axially out of the base element 4.

The cup-shaped lid 8 is connected to the base element 4 by a hinge 12. The lid 8 has a circular-shaped lid bottom 18 from which the cylinder-ring-shaped shell surface 30 projects axially into the direction of the container 2. Preferably, the lid 8 is made of a transparent plastic material. The lid 8 may also be configured in a way that the shell surface 30 is made partly or entirely of a transparent plastic material to allow the visibility of the temper evidence means 13 from outside of the closure device 1.

The lid 8 can be moved back and forth between the closed position 9 in which the lid 8 closes the dispensing opening 7, so that the flowable material 3 is retained in the container 2 and its open position 10 in which the flowable material 3 can be released from the container 2. The hinge 12 is formed by a material bridge between the base element 4 and the lid 8. The hinge 12 is preferably formed monolithically with the base element 4 and the lid 8. The lid 8 is made of a transparent plastic material that is configured to allow the visibility from outside the dispensing device 1 on the temper evidence indication means 13 in their initially closed state.

Referring to the closure device 1 in its open position 10, it can be seen, that the closure device 1 comprises tamper evidence indication means 13 for visually indicating if the lid 8 of the closure device 1 has once been moved out of its closed position 9. The tamper evidence indication means 13 consist of a first indication ring 14 and the second indication ring 15. The function of the temper evidence means will be explained in more detail in the following by referring to FIG. 2-5.

Further, the base element 4 comprises a flange 26 projecting radially to the inside of the closure device 1 defining a duct 27 for pass-through of the spout 11, whereby the spout 11 comprises a flange 28 projecting radially to the outside of the closure device 1, whereby the spout 11 is positioned at least partly inside of the base element 4 so that a ring-shaped channel 29 is formed between the spout flange 28 and the base element flange 26.

Figure 2:
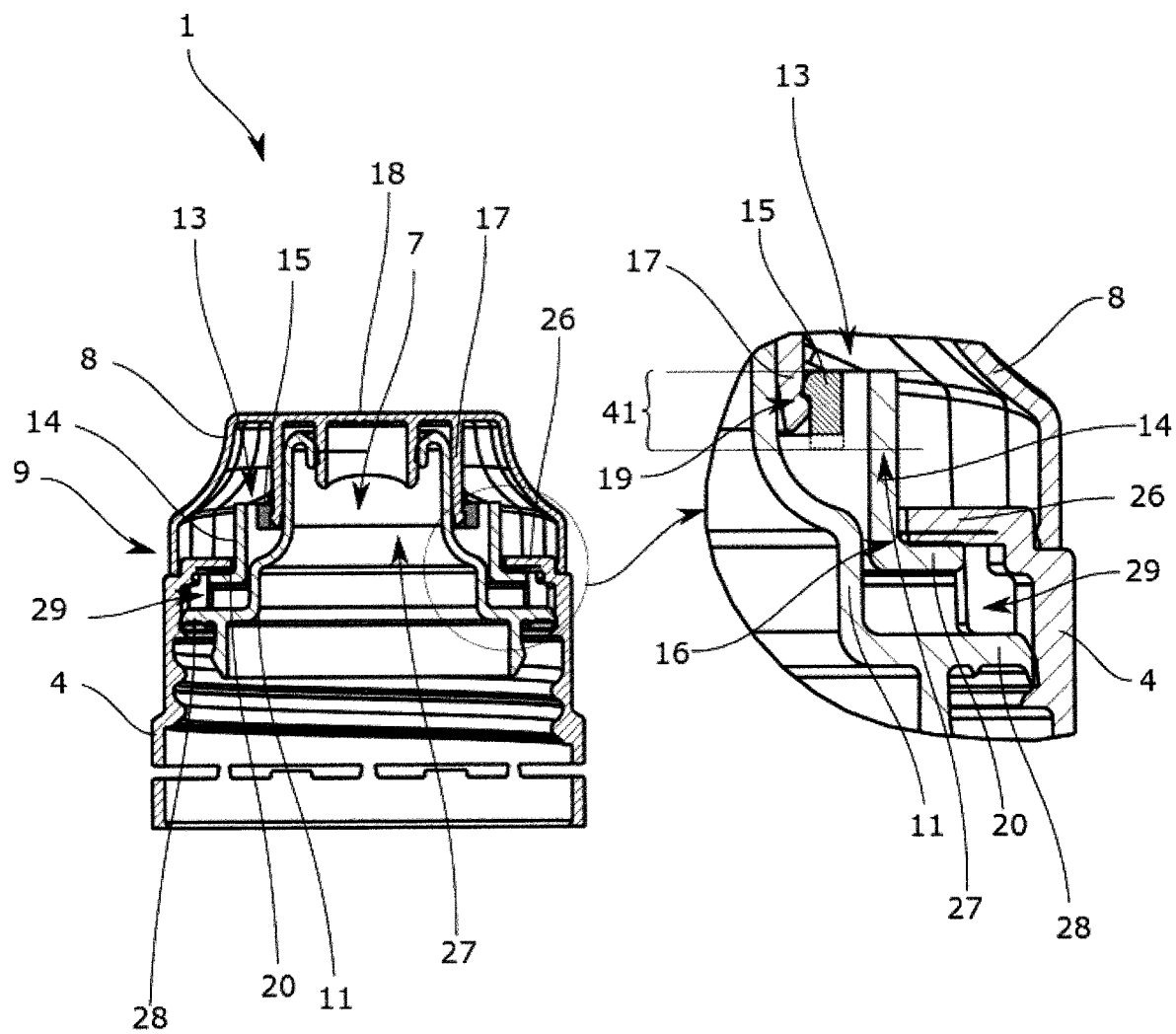
FIG. 2 a cross-sectional view on a closed closure device.

FIG. 2 shows a cross-sectional view on a closed closure device 1 which has not been opened after initial closing.

The closure device comprises the temper evidence indication means 13 with the first indication ring 14 and the second indication ring 15 co-axially arranged in the first indication ring 14. The first indication ring 14 and the second indication ring 15 are connected by multiple radially oriented frangible bridges 6 which are configured to be disrupted when the lid 8 is moved from its closed position 9. The disruption of the frangible bridges 6 is causing an axial movement of the first indication ring 14 relative to the second indication ring 15 which can be very well seen by comparing the positions of the first indication ring 14 and the second indication ring 15 in FIG. 2 and FIG. 3. In the shown embodiment the first indication ring 14 slides in the direction of gravity while the second indication ring 15 remains in place at the spout sealing ring 17. While being in its undisrupted state, the first indication ring 14 covers the view from the generally horizontal viewing direction of a consumer on the second indication ring 15. Therefore, the first indication ring 14 has a first axial height 21 and the second indication ring 15 has a second axial height 22 whereby in the non-disrupted condition the second axial height 22 is completely covered by the first axial height 21 and the first axial height 21 and the second axial height 22 are chosen to be between 1.5:1-5:1, which can be especially seen from FIG. 5.

The first indication ring 14 has a first optical property and the second indication ring 15 has a second optical property being different form the first optical property.

Hence, the consumer can optically distinguish between an originally closed and once-open state of the closure device 1.

An optical property can be chosen from a group comprising light absorption properties, light reflection properties, transparency, opacity, gloss, a surface structure, especially one or more openings, one or more elevations, one or more recesses and any combination of these properties.

Figure 3:
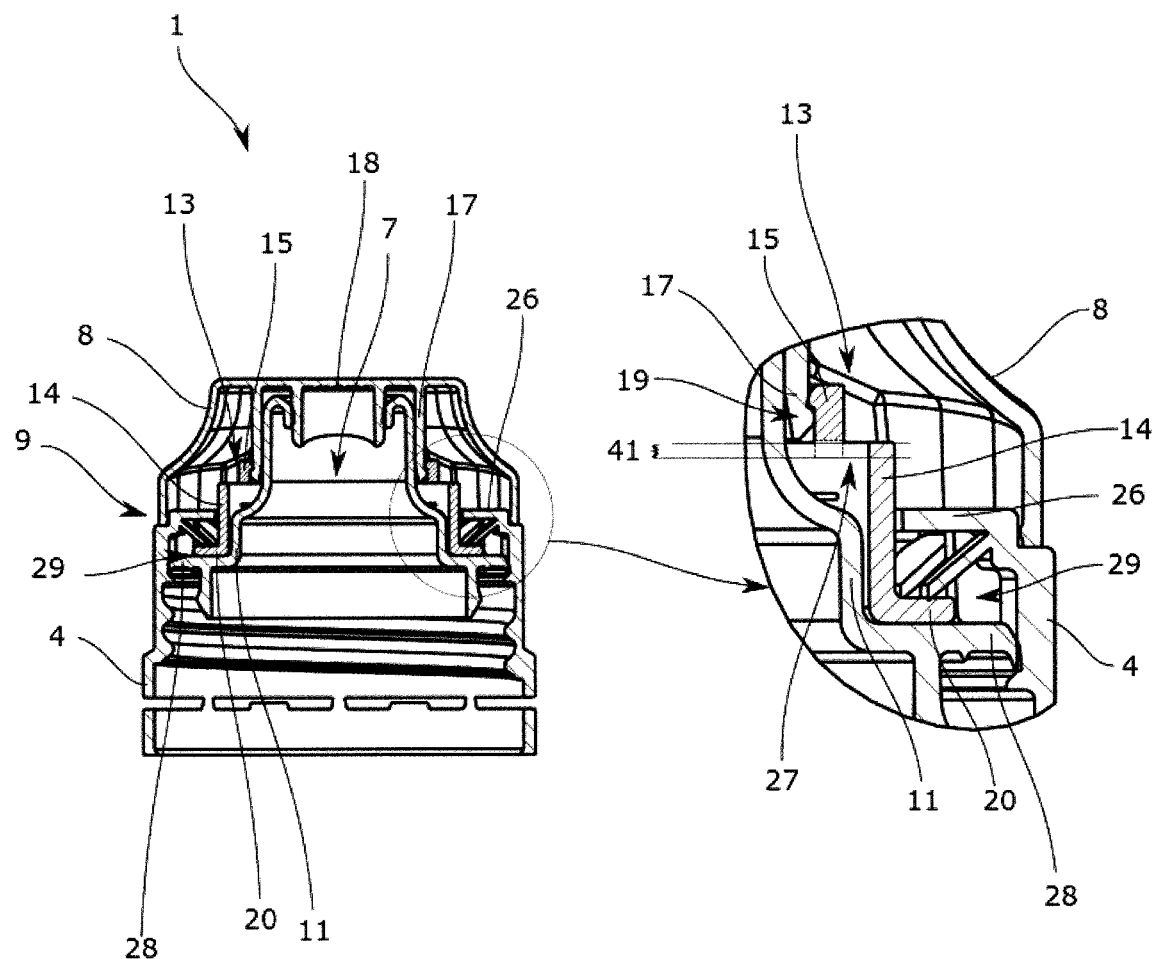
FIG. 3 a cross-sectional view on a closed but once opened closure device.

In the embodiment shown in FIG. 2-3 the first optical property is light absorption in the range of 380-750 nm and the second optical property is light absorption in the range of 380-750 nm, whereby the light absorption ranges of the first optical property and the second optical property are different from each other. Even more preferred the light absorption rate of the first optical property is below 5% over the range of 380-750 nm and the second optical property is a light absorption rate above 50% in the range of 380-750 nm.

The tamper evidence indication means 13 are made from one or more plastic materials by bi-injection moulding.

The second indication ring 15 is connected to the lid 8 and the axial movement of the first indication ring 14 within the closure device 1 is limited at a defined position 16 within the base element 4 in the direction of the opening of the lid 8, causing a disruption of the radially oriented frangible bridge 6, when the lid 8 is moved out of its closed position 9. The first indication ring 14 comprises a flange 20 projecting radially to the outside of the closure device 1 at its distal end facing the container 2. The flange 20 contacts the base element flange 26 defining the defined position 16 in the initially closed position 9 of the closure device 1.

The lid 8 further comprises a spout sealing ring 17 which projects from the lid bottom 18 axially inwardly into the closure device 1 and which contacts the outer surface of the spout 11. The second indication ring 15 is connected to the spout sealing ring 17 by interlocking means 19 for fixing the second indication ring 15 on the spout sealing ring 17.

The lid 8 has a shell surface 30 which is concavely shaped to the inside of the closure device 1.

What is also visible from FIG. 1 is that the first indication ring 14 and the second indication ring 15 are positioned inboard of the closure device 1, so that the first indication ring 14 and the second indication ring 15 are not in direct contact with the environment surrounding the closure device 1.

What becomes obvious by comparing the FIGS. 2 and 3 is that the first indication ring 14 and the second indication ring 15 are coaxially positioned to each other and the first indication ring 14 and the second indication ring 15 having an axially overlapping section 41 before and after the lid 8 of the closure device 1 has once been moved out of its closed position 9. The first indication ring 14 and the second indication ring 15 are coaxially positioned to each other and the first indication ring 14 and the second indication ring 15 having an axially overlapping section 41 before and after the lid 8 of the closure device 1 has once been moved out of its closed position 9 when the lid 8 is in its closed position.

Figure 4:
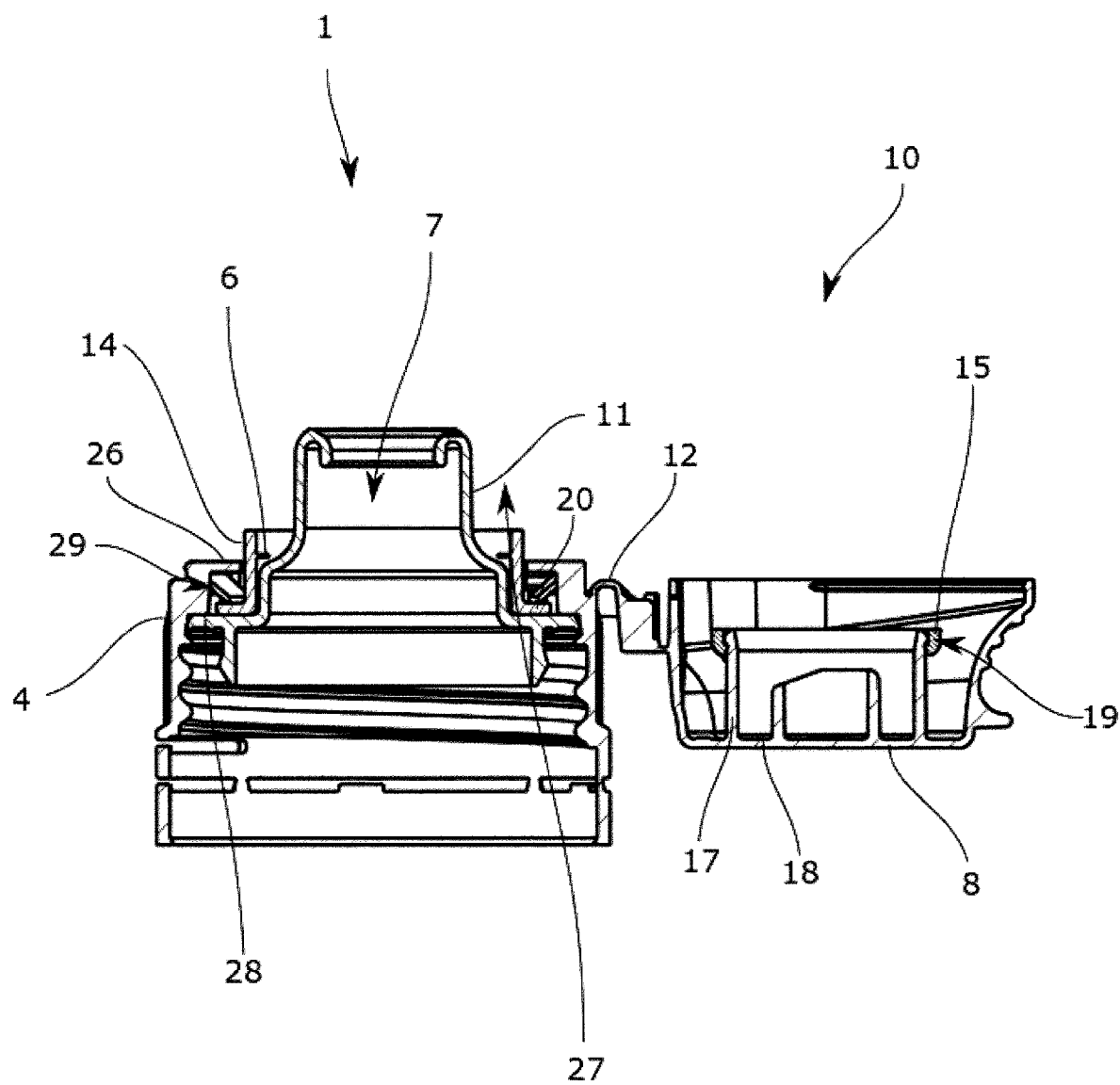
FIG. 4 a cross-sectional view on an open closure device.

FIG. 4 shows a cross-sectional view on an open closure device 1. The hinge 12 connects the lid 8 with the base element 4 so that the lid 8 can be pivoted back and forth to cover or uncover the spout 12. In the shown embodiment, the hinge 12 is a flexible material bridge monolithically formed with the base element 4 and the lid 8.

Figure 5:
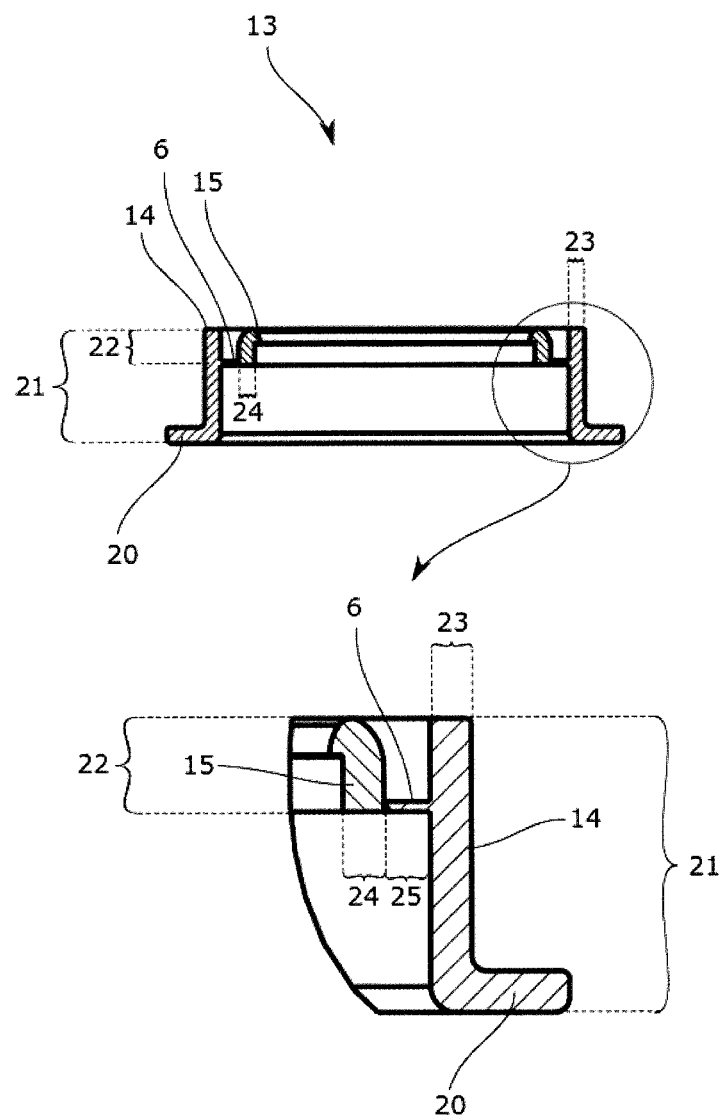
FIG. 5 a cross-sectional view on the tamper evidence indication means.

What is also shown in the FIG. 5 is that the first indication ring 14 has a first radial ring width 23 and the second indication ring 15 has a second radial ring width 24 which is different from the first radial ring width 23.

The frangible bridge/s 6 is/are ring shaped or ring-segment shaped. The ring-shape or the ring-segment-shape is flat, hence, the axial thickness of the ring-shape or ring-segment-shape is lower than the radial length which can be very well seen from the detail view shown in the lower section of FIG. 5. Although not visible from FIG. 5, the temper evidence indication means 13 in the shown embodiment comprise a plurality of frangible bridges 6, whereby the number of frangible bridges 6 is six. The plurality of frangible bridges 6 are essentially identical in ring-segment shape and they are equidistantly positioned between the first indication ring 14 and the second indication ring 15 at an angle of 60°.

Figure 6:
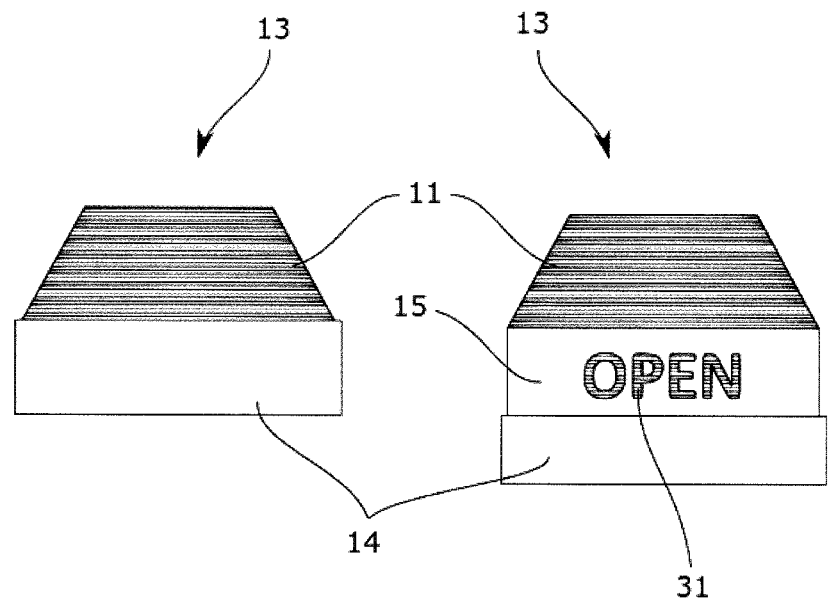
FIG. 6 schematic drawings of different embodiments of the temper evidence indication means, FIG. 7 schematic drawings of different embodiments of the temper evidence indication means, FIG. 8 a cross-sectional view detail view on the closure device with a spring arrangement in the initially closed state and in the once opened state, FIG. 9 a cross-sectional view detail view on a head-stand closure device with a spring arrangement in the initially closed state and in the once opened state, FIG. 10 a cross-sectional view detail view on the closure device with a spring arrangement in the initially closed state and in the once opened state, and FIG. 11 a cross-sectional view on the tamper evidence indication means during assembly with assembly shaft.
Figure 6:
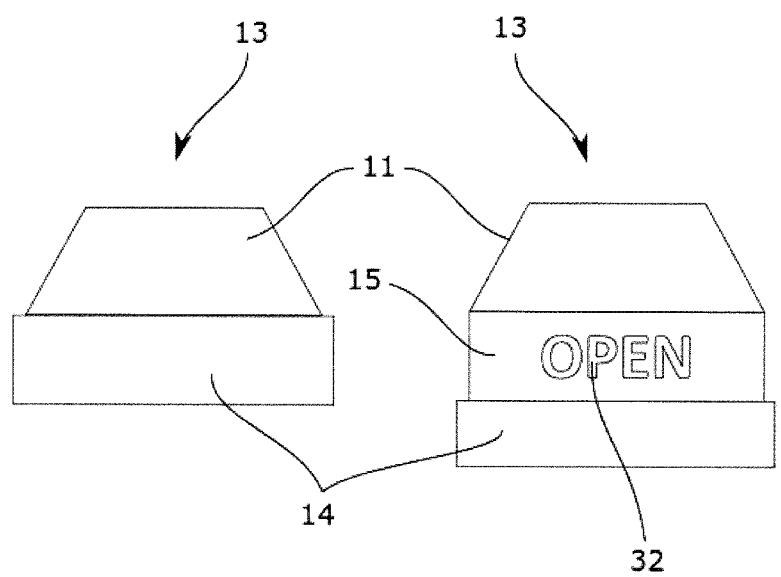
Figure 7:
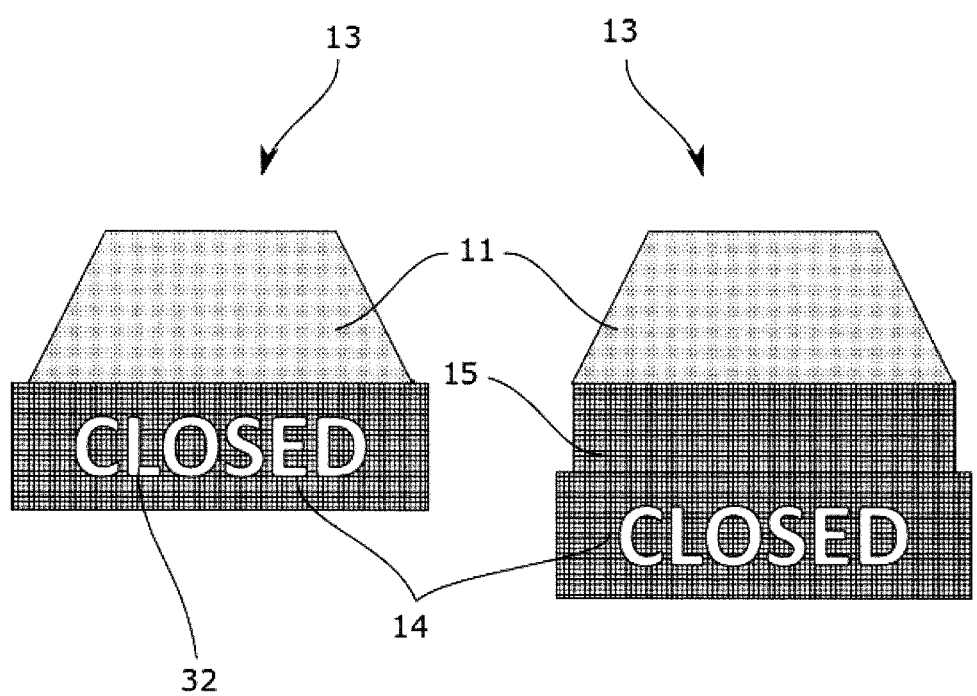

The FIGS. 6-7 show alternative combinations of optical properties. In the embodiment shown in the upper section of FIG. 6, the first indication ring 14 is made of an opaque material which has a colour perceived as white, whereas the second indication ring 15 is made of an opaque material which has a colour perceived as being white. The second indication ring 15 comprises openings 31 in the shape of letters, which become visible, when the first indication ring 14 is moved axially below the second indication ring 15. The spout 11 preferably has a colour perceived as being different from white, for example red, orange, blue or violet, so that the openings are contrasted against the white second indication ring 15.

In the lower section of FIG. 6, an embodiment is shown in which the first indication ring 14 is made of an opaque material which has a colour perceived as white, whereas the second indication ring 15 is made of an opaque material which has a colour perceived as being white. The second indication ring 15 comprises elevations 32 and/or recesses 32 e.g. in the shape of letters, which become visible, when the first indication ring 14 is moved axially below the second indication ring 15.

FIG. 7 shows another embodiment in which the first indication ring 14 is made of an opaque material which has a colour perceived as white with elevations 32 and/or recesses 32 in its surface, for example in the shape of letters, which become invisible, when the first indication ring 14 is moved axially below the second indication ring 15. The second indication ring 15 is made of an opaque material which has a colour perceived as being white. The spout 11 preferably may have a colour perceived as being different from white.

Figure 8:
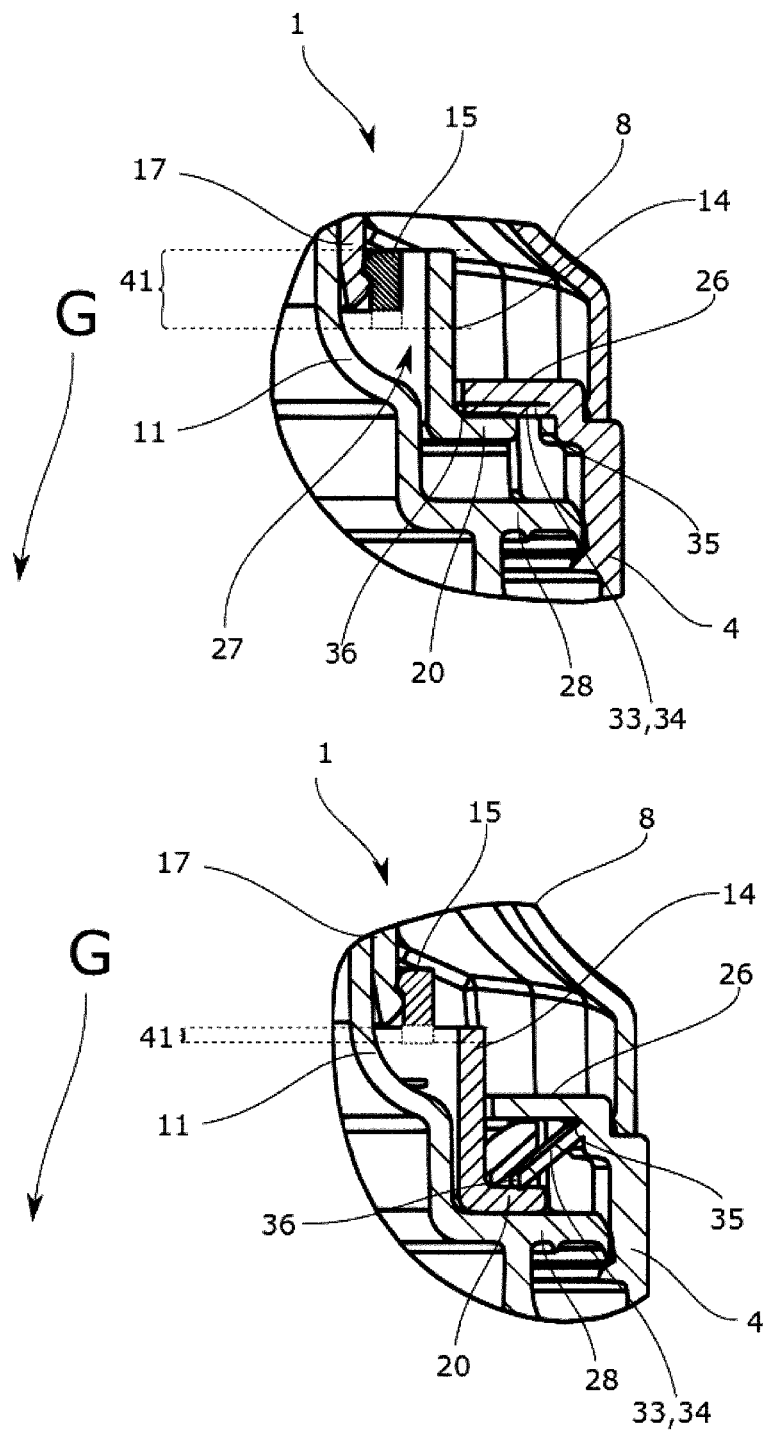
Figure 9:
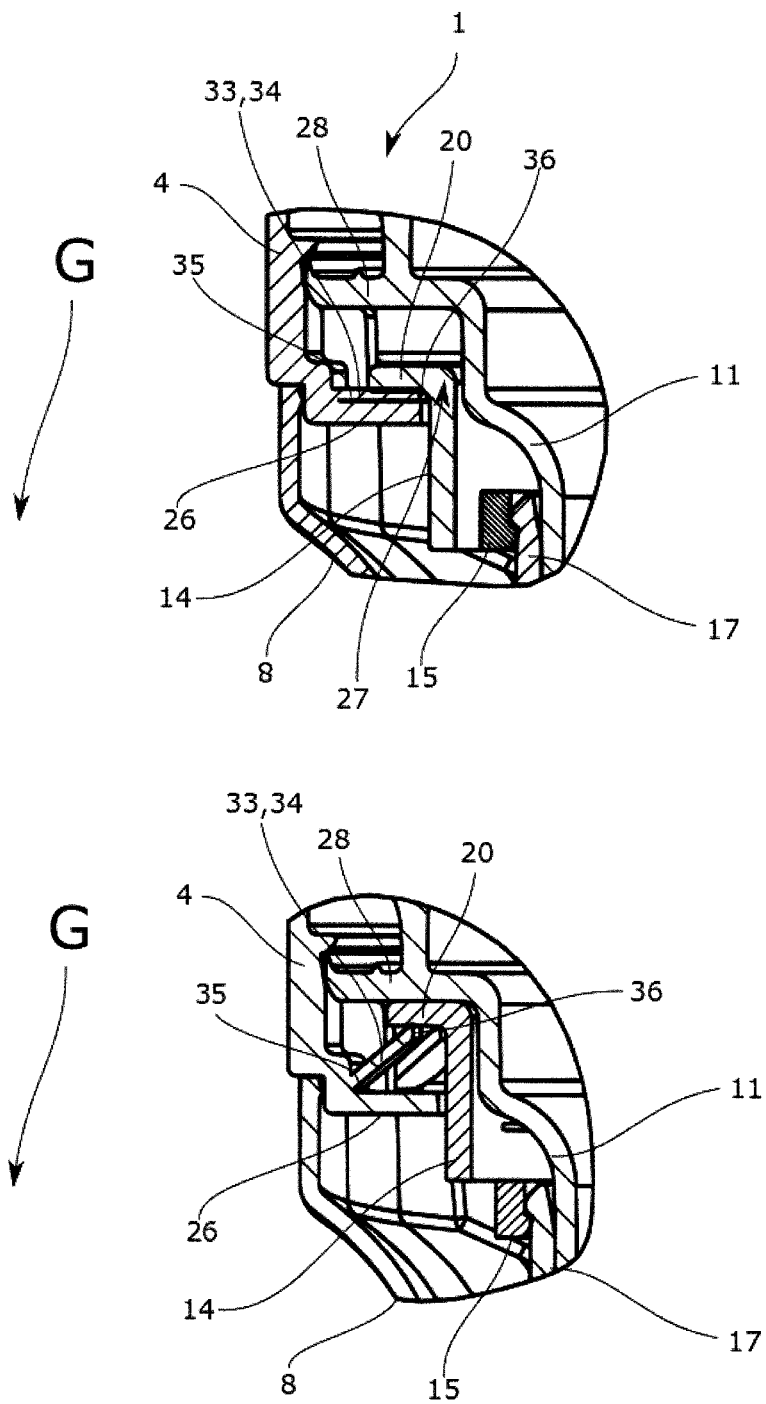
Figure 10:
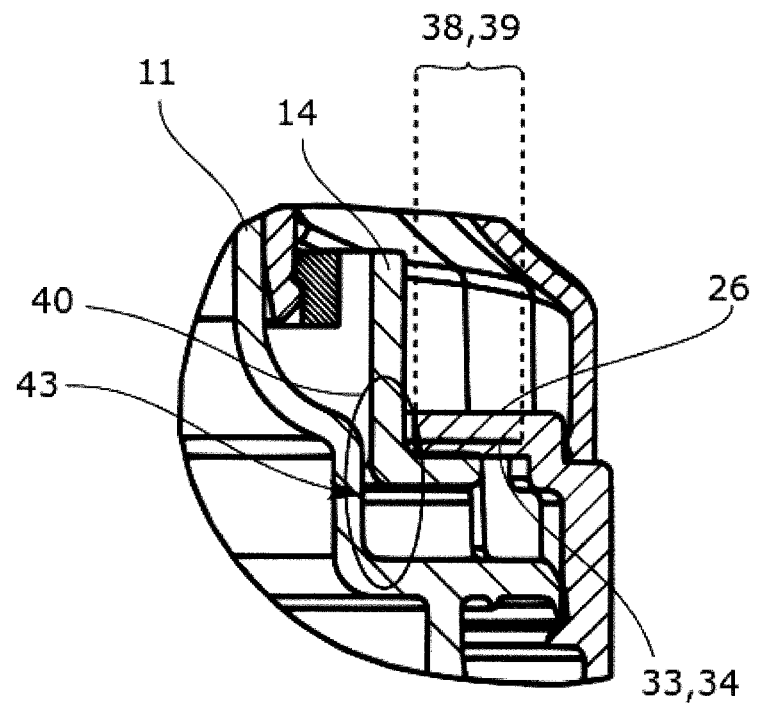
Figure 10:
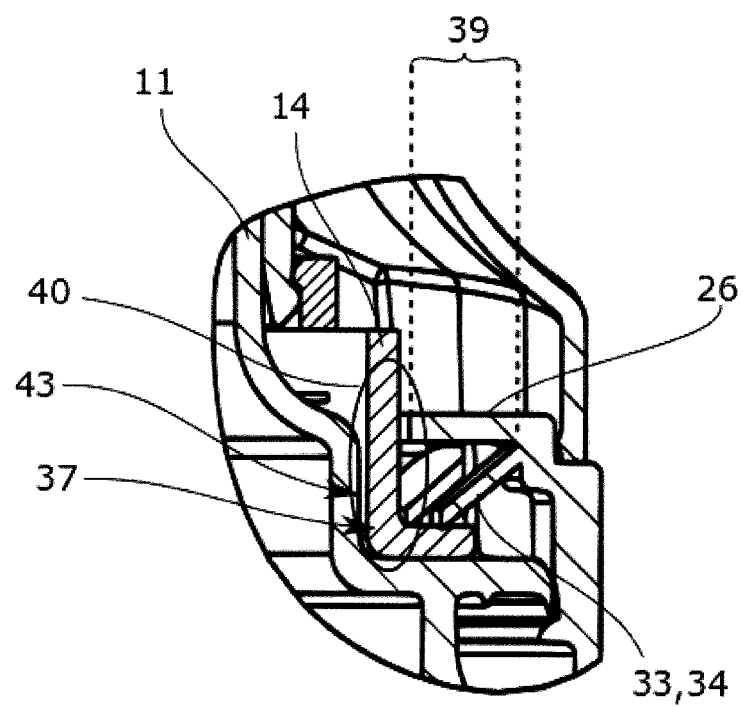

The spring arrangement of the closure device 1 will now be described in more detail by turning to FIG. 8-10. FIG. 8-10 show cross-sectional detail views of the temper evidence indication means 13.

What can be seen well in the FIGS. 8-10 is that the first indication ring 14 is coupled to a spring arrangement 33 so that the first indication ring 14 is spring-loaded in the direction of the container 2 prior to the disruption of the frangible bridge/s 6. The spring force applied to the first indication ring 14 is configured to hold the first indication ring 14 in a defined position 37 after the disruption of the frangible bridge/s 6 which is shown in FIG. 10.

The base element 4 and the spout 11 are configured to define an axial linear plain bearing 40—as shown in FIG. 10—in which the first indication ring 14 is guided into its defined position 37 after the disruption of the frangible bridge/s 6. The inner surface of the first indication ring 14 is guided by an axial section 43 of the spout 11. The outer surface of the first indication ring 14 is guided by the axial front surface of the base element flange 26. A tilting of the first indication ring 14 while moving its defined position 37 after the disruption of the frangible bridge/s 6 is thereby prevented and the functional safety of the temper evidence indication means 13 is increased.

The spring arrangement 33 comprises a plurality of spring elements 34, which are integrally formed with the base element 4. The spring elements 34 are supported at their first distal end 35 by the base ring 4 and are supported with their second distal end 36 at the flange 20 of the first indication ring 14. In the shown embodiment, the spring elements 34 are configured as spring tongues with a flat cuboid-shaped spatial form. The spring elements 34 are arranged equidistantly around the inner surface of the cylinder-ring-shaped base element 4.

The spring arrangement 33 is coupled with the flange 20 so that the spring force of the spring arrangement 33 is applied to the flange 20. The free ends of the spring elements 34 configured as spring tongues rest spring-loaded on the flange 20 in the non-disrupted state of the frangible bridge/s 6, which is shown in the upper representation of FIG. 8.

In the lower configuration, the state of the temper evidence indication means 13 is shown after the disruption of the frangible bridge/s 6. Here, the first indication ring 14 is hold in its defined position 37 by the spring elements 34, which still rests against the flange 20 ensuring that the first indication ring 14 is hold in the shown position 37. The spring force of the spring elements 34 also supports the movement of the first indication ring 14 into its defined position 37 after the disruption of the frangible bridge/s 6.

The embodiment in FIG. 8 shows a conventional closure device 1, where the dispensing opening 7 of the closure device 1 is above the container 2 in its intended transport and/or storage position.

FIG. 9 shows an embodiment where the closure device 1 is arranged below the container 2 in its intended transport and/or storage position, which is also known as head-stand closure device. The closure devices 1 from FIG. 8 and FIG. 9 are identically configured. The spring arrangement 33 of the head-stand closure device 1 of FIG. 9 is constructed to move the first indication ring 14 against the direction of gravity into its defined position 37 after disruption of the frangible bridge/s 6.

FIG. 10 especially shows that the spring elements 34 have a radial length 38 that is equal to the radial length 39 of the flange 26 of the base element 4.

Figure 11:
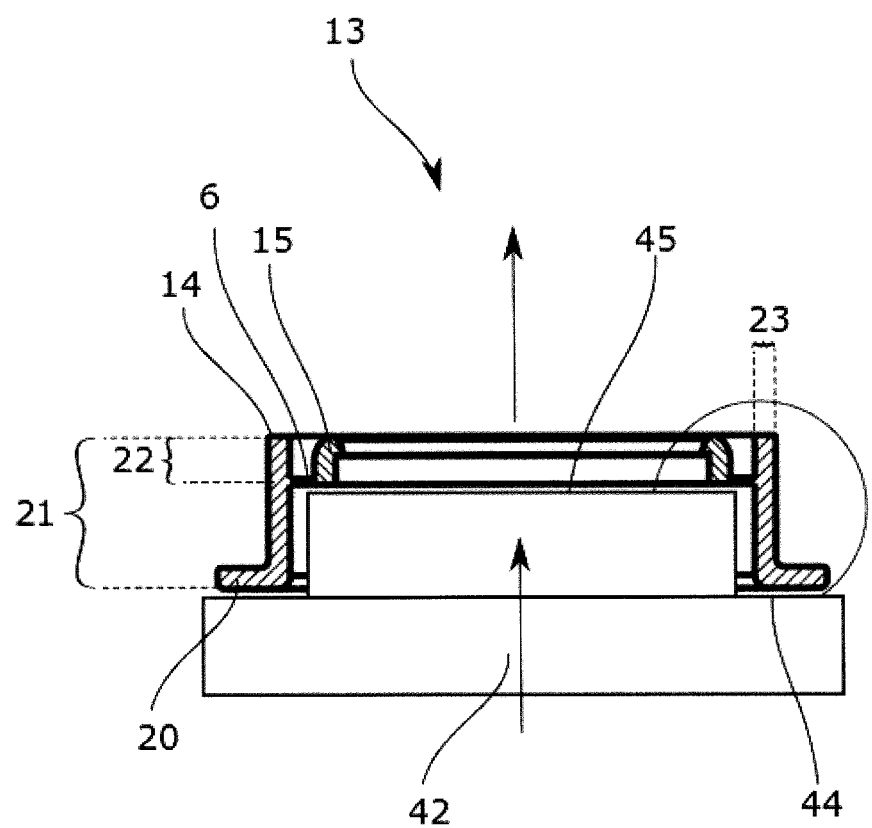

FIG. 11 shows a cross-sectional view on the temper evidence indication means 13 during assembly with assembly shaft 42. The assembly shaft is basically cylindrically-shaped with a shoulder 44. Extending axially from the shoulder 44 is a shaft section that has a diameter smaller than the diameter of the shoulder section of the assembly shaft 42 so that this smaller diameter section can be moved into the first indication ring 14. This section smaller in diameter has an axial height that corresponds to the difference of the first axial height 21 and the second axial height 22. The temper evidence indication means 13 are placed on the cylinder-shaped assembly shaft 42, which has the shoulder 44 on which the flange 20 of the first indication ring 14 rests. The second indication ring 15 rests against the front surface 45 of the assembly shaft 42. Hence, during assembly of the temper evidence indication means 13, no axial stress is exposed to the frangible bridge/s 6 and the position of the temper evidence indication means 13 is well defined during assembly.

The invention is not limited to the embodiments shown in the figures. The above description is therefore not to be regarded as restrictive, but as explanatory. The following patent claims are to be understood in such a way that a named feature is present in at least one form of implementation of the invention. This does not exclude the presence of further features. If the patent claims and the above description define 'first' and 'second' features, this indication serves to distinguish two features of the same kind without establishing an order of priority.

REFERENCES 1 closure device
2 container
3 flowable material
4 base element
5 container opening
6 frangible bridge
7 dispensing opening
8 lid
9 closed position
10 open position
11 spout
12 hinge
13 tamper evidence indication means
14 first indication ring
15 second indication ring
16 position
17 spout sealing ring
18 lid bottom
19 interlocking means
20 flange
21 first axial height
22 second axial height
23 first radial ring width
24 second radial ring width
26 base element flange
30 shell surface
31 opening
32 elevations/recesses
33 spring arrangement
34 spring elements
35 first distal end
36 second distal end
37 position
38 radial length
39 radial length
40 plain bearing
41 axial overlapping section
42 assembly shaft
43 axial spout section
44 shoulder
45 front surface

The invention claimed is:

1. Closure device for a container in which a flowable material is stored, comprising:
a base element, which can be fastened on a container opening of the container
a spout with a dispensing opening whereby the spout is positioned inboard of the base element, and a lid connected to the base element by a hinge,
whereby the lid can be moved back and forth between a closed position in which the lid closes the dispensing opening so that the spout is not accessible and an open position in which the spout is accessible, tamper evidence indication means for visually indicating if the lid of the closure device has once been moved out of the closed position, characterised in that the tamper evidence indication means comprise a first indication ring and at least one second indication ring, whereby the first indication ring and the at least one second indication ring are connected by at least one frangible bridge which is configured to be disrupted when the lid is moved from the closed position, causing an axial movement of the first indication ring relative to the at least one second indication ring, whereby the first indication ring and the at least one second indication ring are coaxially positioned to each other and the first indication ring and the at least one second indication ring having an axially overlapping section before and after the lid of the closure device has once been moved out of the closed position.

2. Closure device according to claim 1,
characterised in that
the at least one frangible bridge is radially oriented.

3. Closure device according to claim 2,
characterised in that
the at least one frangible bridge has a radial length between 0.3-1.2 mm.

4. Closure device according to claim 1,
characterised in that
the axially overlapping section after the lid has once been moved out of the closed position is between 5-20% of the first indication ring.

5. Closure device according to claim 1,
characterised in that
the first indication ring has a first axial height and the at least one second indication ring has a second axial height whereby in the non-disrupted condition, the second axial height is completely covered by the first axial height.

6. Closure device according to claim 1,
characterised in that
the closure device is constructed so that the at least one frangible bridge remains at the first indication ring after the disruption from the at least one second indication ring.

7. Closure device according to claim 1,
characterised in that
the first indication ring and the at least one second indication ring are positioned inboard of the closure device, so that the first indication ring and the at least one second indication ring are not in direct contact with the environment surrounding the closure.

8. Closure device according to claim 1,
characterised in that
the tamper evidence indication means are made from one or more plastic materials by bi-injection moulding.

9. Closure device according to claim 1,
characterised in that
the lid comprises a spout sealing ring which projects in the closed position of the lid from a lid bottom axially inwardly into the closure device and which contacts the outer surface of the spout, whereby the at least one second indication ring is connected to the spout sealing ring.

10. Closure device according to claim 9,
characterised in that
the at least one second indication ring comprises interlocking means for fixing the at least one second indication ring on the spout sealing ring.

11. Closure device according to claim 1,
characterised in that
the base element comprises a flange projecting radially to the inside of the closure device defining a duct for pass-through of the spout, whereby the spout comprises a flange projecting radially to the outside of the closure device, whereby the spout is positioned at least partly inside of the base element so that a ring-shaped channel is formed between the spout flange and the base element flange.

12. Closure device according to claim 1,
characterised in that
the base element and the spout are configured to define an axial linear plain bearing in which the first indication ring is guided into the defined position after the disruption of the at least one frangible bridge.

* * * * *